(12) United States Patent
Anseth

(10) Patent No.: US 9,759,250 B2
(45) Date of Patent: Sep. 12, 2017

(54) MOUNTING SYSTEMS FOR FASTENING ONE SURFACE TO ANOTHER

(71) Applicant: Jeremy James Anseth, Woodland Hills, CA (US)

(72) Inventor: Jeremy James Anseth, Woodland Hills, CA (US)

(*) Notice: Subject to any disclaimer, the term of this patent is extended or adjusted under 35 U.S.C. 154(b) by 0 days.

(21) Appl. No.: 14/968,715

(22) Filed: Dec. 14, 2015

(65) Prior Publication Data
US 2017/0167519 A1    Jun. 15, 2017

(51) Int. Cl.
*F16B 5/00* (2006.01)
*F16B 21/09* (2006.01)
*F16B 17/00* (2006.01)

(52) U.S. Cl.
CPC ............. *F16B 21/09* (2013.01); *F16B 5/008* (2013.01); *F16B 5/0056* (2013.01); *F16B 17/00* (2013.01); *Y10T 29/49826* (2015.01); *Y10T 403/58* (2015.01)

(58) Field of Classification Search
CPC .... F16B 5/0012; F16B 5/0016; F16B 5/0036; F16B 5/004; F16B 5/0048; F16B 5/0052; F16B 5/0056; F16B 5/008; F16B 5/0084; F16B 5/0092; F16B 5/0635; F16B 5/0657; F16B 5/0664; F16B 5/126; F16B 5/128; F16B 17/00; F16B 21/09; F16B 2005/0671; Y10T 403/50; Y10T 403/58; Y10T 403/581; Y10T 403/7092; Y10T 403/7094; Y10T 24/44043; Y10T 24/44051; Y10T 29/49826
USPC ..... 403/286, 315, 316, 381, 380; 52/506.05, 52/506.08–506.1, 512; 24/460, 461; 29/428
See application file for complete search history.

(56) References Cited

U.S. PATENT DOCUMENTS

| | | | | | |
|---|---|---|---|---|---|
| 3,365,847 | A | * | 1/1968 | Josek | ....................... E04D 13/15 52/58 |
| 3,851,429 | A | * | 12/1974 | Zimmer | ................... E04D 13/15 52/60 |
| 6,131,867 | A | * | 10/2000 | Mallek | ....................... E06B 9/00 248/261 |

(Continued)

FOREIGN PATENT DOCUMENTS

DE    3302105 A1 *  7/1983  ............... E04C 2/40

OTHER PUBLICATIONS

"Coefficients of Linear Thermal Expansion." The Engineering Toolbox. Sep. 9, 2014, [online], [retrieved on 08-0692016] Retrieved from the Internet <URL: https://web.archive.org/web/20140909102703/http://www.engineeringtoolbox.com/linear-expansion-coefficients-d_95.html >.*

*Primary Examiner* — Josh Skroupa
(74) *Attorney, Agent, or Firm* — Mohr Intellectual Property Law Solutions, PC

(57) ABSTRACT

A mounting system may comprise a male coupling and a female coupling. The male coupling may include an upper flange and a lower flange. The female coupling may include an upper lip forming a downward-facing open channel and a lower lip form an upward-facing open channel. The upper lip may be configured to receive the upper flange and allow it to pivot in the downward-facing open channel, thereby bringing the lower flange proximal the lower lip. The lower lip may be configured to receive the lower flange in the upward-facing open channel, thereby securing the male coupling to the female coupling.

13 Claims, 5 Drawing Sheets

(56) References Cited

U.S. PATENT DOCUMENTS

| | | | | |
|---|---|---|---|---|
| 6,675,517 B1* | 1/2004 | Chia | ................... | G09F 7/08 |
| | | | | 40/611.01 |
| 8,341,810 B2* | 1/2013 | Rayos | ................... | B60R 9/048 |
| | | | | 224/321 |
| 8,651,442 B2* | 2/2014 | Takaya | ................... | H02B 1/052 |
| | | | | 248/225.21 |
| 8,745,941 B2* | 6/2014 | Macdonald | ......... | E04F 13/0825 |
| | | | | 52/235 |
| 8,973,330 B2* | 3/2015 | Egri, II | ............... | E04F 13/0805 |
| | | | | 248/231.81 |
| 9,032,593 B2* | 5/2015 | Rayos | ................... | F16B 17/00 |
| | | | | 224/321 |
| 2010/0216334 A1* | 8/2010 | Christmann | ........... | H02B 1/052 |
| | | | | 439/532 |
| 2014/0260041 A1* | 9/2014 | Peck | ................... | F16B 5/0685 |
| | | | | 52/489.1 |
| 2015/0260209 A1* | 9/2015 | Rayos | ................... | F16B 5/0664 |
| | | | | 24/462 |

* cited by examiner

MOUNTING SYSTEMS FOR FASTENING ONE SURFACE TO ANOTHER

BACKGROUND

The present disclosure relates generally to fastening hardware. In particular, mounting devices for fastening one surface to another are described.

Known mounting hardware systems are not entirely satisfactory for the range of applications in which they are employed. For example, existing two-piece panel mounting systems, such as "z clips", may rely on gravity to hold the two pieces of the mounting system together. Thus, such systems may be limited to wall hanging applications.

Furthermore, such conventional wall hanging systems may be susceptible to inadvertent release of the mounting device, for example by bumping the panel upward causing the z clips to disengage from each other. Inadvertent release of the mounting hardware may cause a mounted panel to fall, potentially damaging the object and/or injuring those nearby.

In addition, other conventional mounting hardware, such as simple screws or nails, may not allow for thermal expansion and contraction of a mounted object, such as a wood panel. Thus, mounted objects may warp or otherwise distort as a result of such expansion and contraction. Furthermore, conventional mounting hardware may leave unsightly screw and/or nail holes on the surface of the mounted object.

Thus, there exists a need for mounting systems that improve upon and advance the design of known mounting hardware. Examples of new and useful mounting systems relevant to the needs existing in the field are discussed below.

SUMMARY

The present disclosure is directed to mounting systems. In one embodiment, a mounting system comprises a male coupling and a female coupling. The male coupling may include a first rear face, a first front face, an upper flange and a lower flange. The first rear face may be configured to attach to a first surface. The upper flange may extend upward from the first front face. The lower flange may extend downward from the first front face.

The female coupling may be configured to mate with the male coupling. The female coupling may include a second rear face, a second front face, an upper lip and a lower lip. The second rear face may be configured to attach to a second surface. The upper lip may be disposed on the second front face. The upper lip may form a downward-facing open channel. The lower lip may be disposed on the second front face. The lower lip may form an upward-facing open channel.

The upper lip may be configured to receive the upper flange and allow it to pivot in the downward-facing open channel, thereby bringing the lower flange proximal the lower lip. The lower lip may be configured to receive the lower flange in the upward-facing open channel, thereby securing the male coupling to the female coupling.

DETAILED DESCRIPTION

The disclosed mounting systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various mounting systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-4, a first example of a mounting system, mounting system 10, will now be described. Mounting system 10 functions to securely mount or fasten a first surface to a second surface. For example mounting system 10 may be employed to fasten a decorative wood panel to a substrate, among many other applications as described below. The reader will appreciate from the figures and description below that mounting system 10 addresses shortcomings of conventional mounting or fastening systems.

For example, unlike conventional z clips which only secure a panel in one direction, when mounting system 10 is employed in a wall-mounting application, the female coupling secures both the bottom and the top of the male coupling. Thus, mounting system 10 cannot be inadvertently disengaged by bumping the panel upwards.

Furthermore, because both the bottom and the top of the male coupling are secured by the female coupling, the mounting system 10 does not rely on gravity in order to remain engaged. Thus, mounting system 10 is not limited to wall mounting applications; mounting system 10 may be employed in wall, ceiling and floor applications, among others.

In addition, mounting system 10 allows for thermal expansion and contraction of a panel in at least two directions, as further described below.

Figure 1:
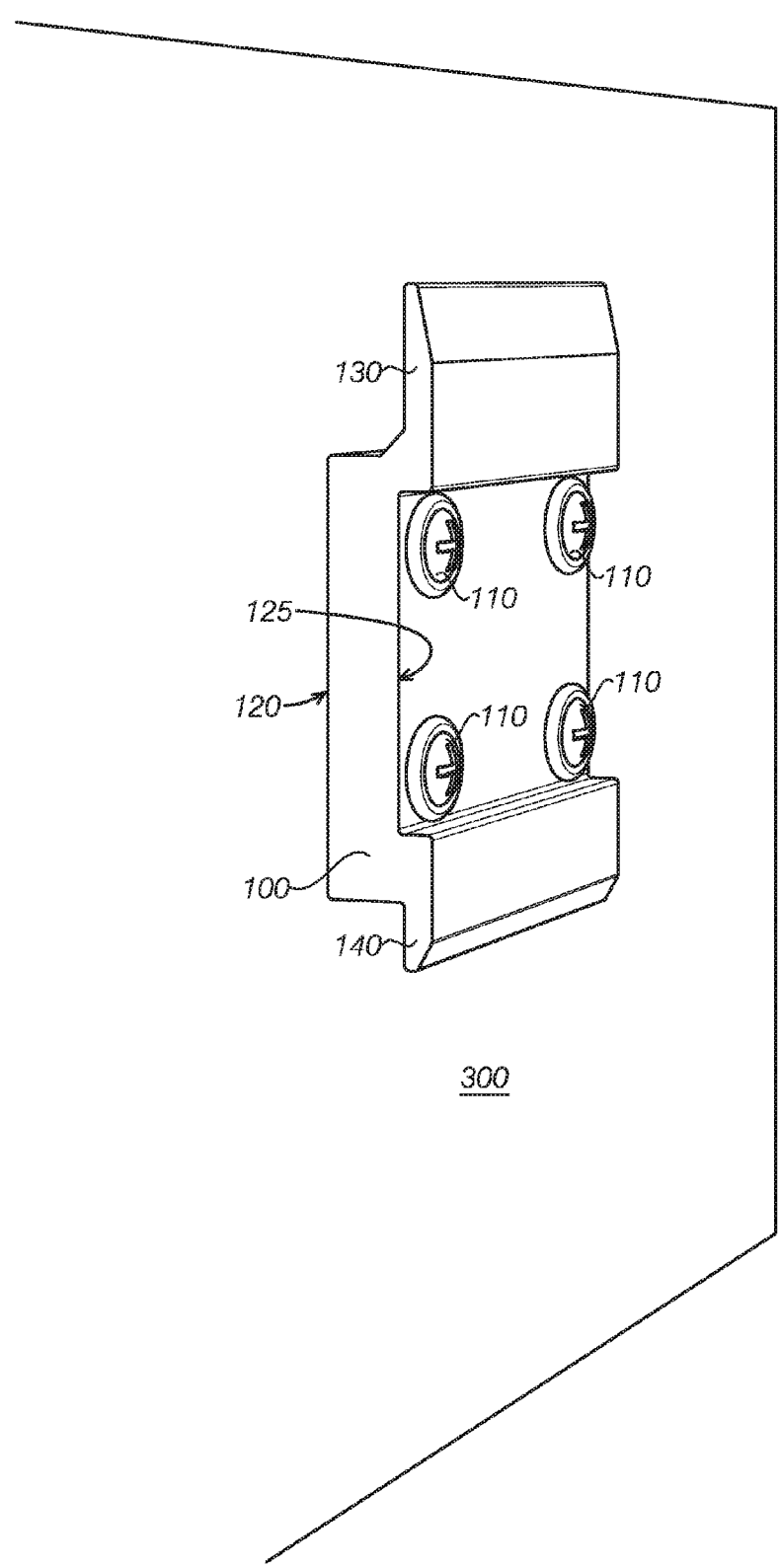
FIG. 1 is a perspective view of a first embodiment of a male coupling in accordance with the present disclosure.

Mounting system 10 includes a male coupling 100 and a female coupling 200. As can be seen in FIG. 1, male coupling 100 may have a first rear face 120, a first front face 125, an upper flange 130 and a lower flange 140.

The first rear face 120 may be configured to attach to a first surface 300. In some embodiments first surface 300 may be a flat surface. In other embodiments, first surface 300 may be a curved or irregular surface. In one example, first surface 300 may be a rear surface of a panel to be mounted. In another example, first surface 300 may be a front surface of a wall, floor, ceiling or other substrate.

In the embodiment of FIG. 1, first rear face 120 of male coupling 100 is configured to attach to first surface 300 via fasteners 110. In the illustrated embodiment, fasteners 110 are inserted into the first front face 125 such that the shaft of each fastener 110 extends through first rear face 120 and into first surface 300. Thus, the male coupling 100 may be fixedly attached to the first surface 300.

In the illustrated embodiment, fasteners 110 are screws. In other embodiments, the fasteners may be nails, bolts or other fasteners. Further, in some embodiments, first rear face 120 may be configured to attach to first surface 300 via an adhesive.

In the illustrated embodiment, male coupling 100 has a H-shaped cross section Upper flange 130 of male coupling 100 extends upward from first front face 125. As shown in FIG. 1, the upper flange 130 is spaced apart from first surface 300 thereby forming a recess behind upper flange 130. Similarly, lower flange 140 extends downward from first front face 125. Lower flange 140 is spaced apart from first surface 300, thereby forming a recess behind lower flange 140.

As used herein, the terms upper, lower, upward, downward, and the like are used as relative terms to describe the spatial relationships of the components of male and female couplings 100, 200 when the couplings are oriented such that upper flange 130 and upper lip 230 extend upward, as shown in FIGS. 1-4. As the reader will appreciate, the male and female couplings may be used to fasten a first surface to a second surface in any spatial orientation.

Figure 2:
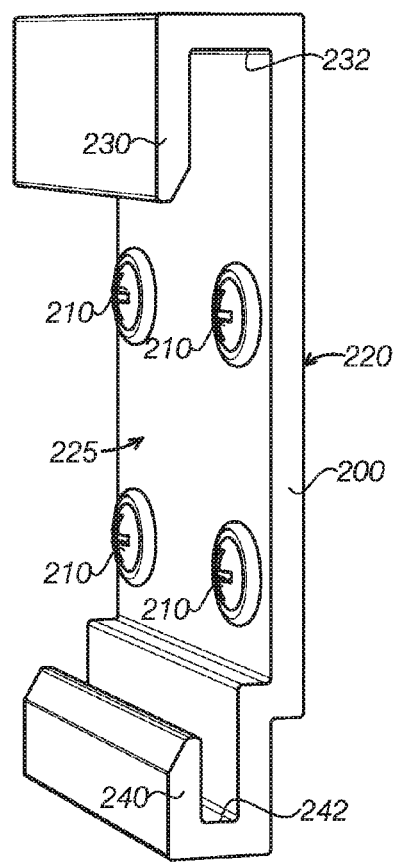
FIG. 2 is a perspective view of a first embodiment of a female coupling in accordance with the present disclosure.

Turning now to FIG. 2, a first embodiment of a female coupling 200 is shown. Female coupling 200 may include a second rear face 220, a second front face 225, an upper lip 230 and a lower lip 240.

Second rear face 220 may be configured to attach to a second surface 400. In some embodiments second surface 400 may be a flat surface. In other embodiments, second surface 400 may be a curved or irregular surface. In one example, second surface 400 may be a rear surface of a panel to be mounted. In another example, second surface 400 may be a front surface of a wall, floor, ceiling or other substrate.

In the embodiment of FIG. 2, second rear face 220 of female coupling 200 is configured to attach to second surface 400 via fasteners 210. In the illustrated embodiment, fasteners 210 are inserted into the second front face 225 such that the shaft of each fastener 210 extends through second rear face 220 and into second surface 400. Thus, the female coupling 100 may be fixedly attached to the second surface 400.

In the illustrated embodiment, fasteners 210 are screws. In other embodiments, the fasteners may be nails, bolts or other fasteners. Further, in some embodiments, second rear face 220 may be configured to attach to second surface 400 via an adhesive.

Upper lip 230 of female coupling 200 is disposed on second front face 225. As shown in FIG. 2, the upper lip 230 curls downward, thereby forming a downward-facing open channel 232. Similarly, lower lip 240 is disposed on second front face 225. Lower lip 240 curls upward, thereby forming an upward-facing open channel 242.

Figure 3:
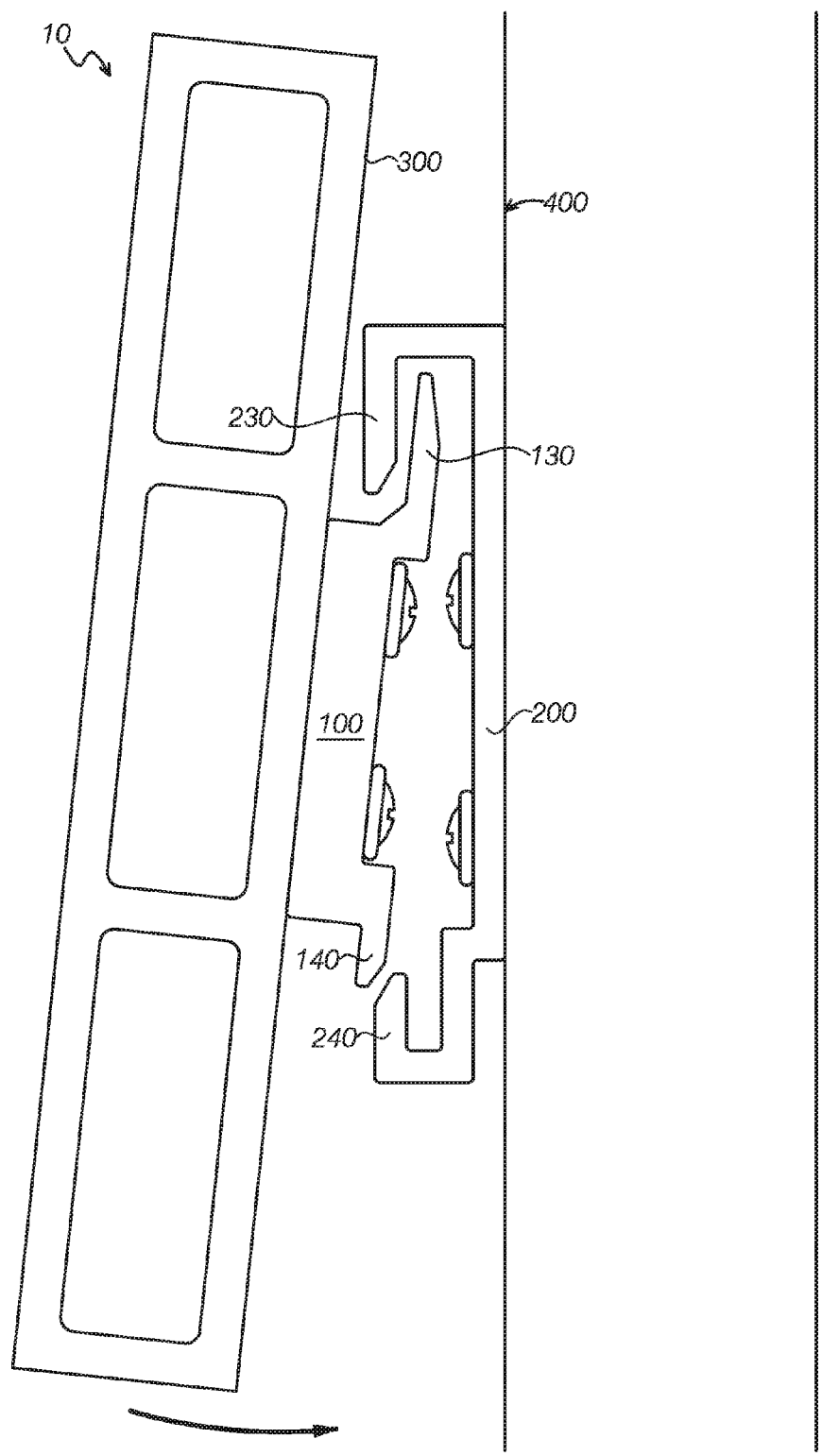
FIG. 3 is a cross sectional view of a first embodiment of a mounting system, wherein the male coupling of FIG. 1 may be rotated into place to mate with the female coupling of FIG. 2.

Turning now to FIG. 3, a first cross sectional view of mounting system 10 is shown. As can be seen, male coupling 100 is attached to first surface 300 and female coupling 200 is attached to second surface 400. Upper lip 230 may be configured to receive the upper flange 130 in channel 232. In this regard the male coupling may be oriented at a slight angle with respect to female coupling 200, as shown in FIG. 3, in order to insert the upper flange 130 into channel 232.

Male coupling 100 may then be rotated, thereby bringing lower flange 140 proximal the lower lip, as shown in FIG. 3. In this regard, the upper flange 130 of male coupling 100 may pivot in channel 232 until lower flange 140 clears lower lip 240. Male coupling 100 may then slide downward such that lower flange 140 may slide into channel 242 of lower lip 240, thereby securing male coupling 100 to female coupling 200.

Figure 4:
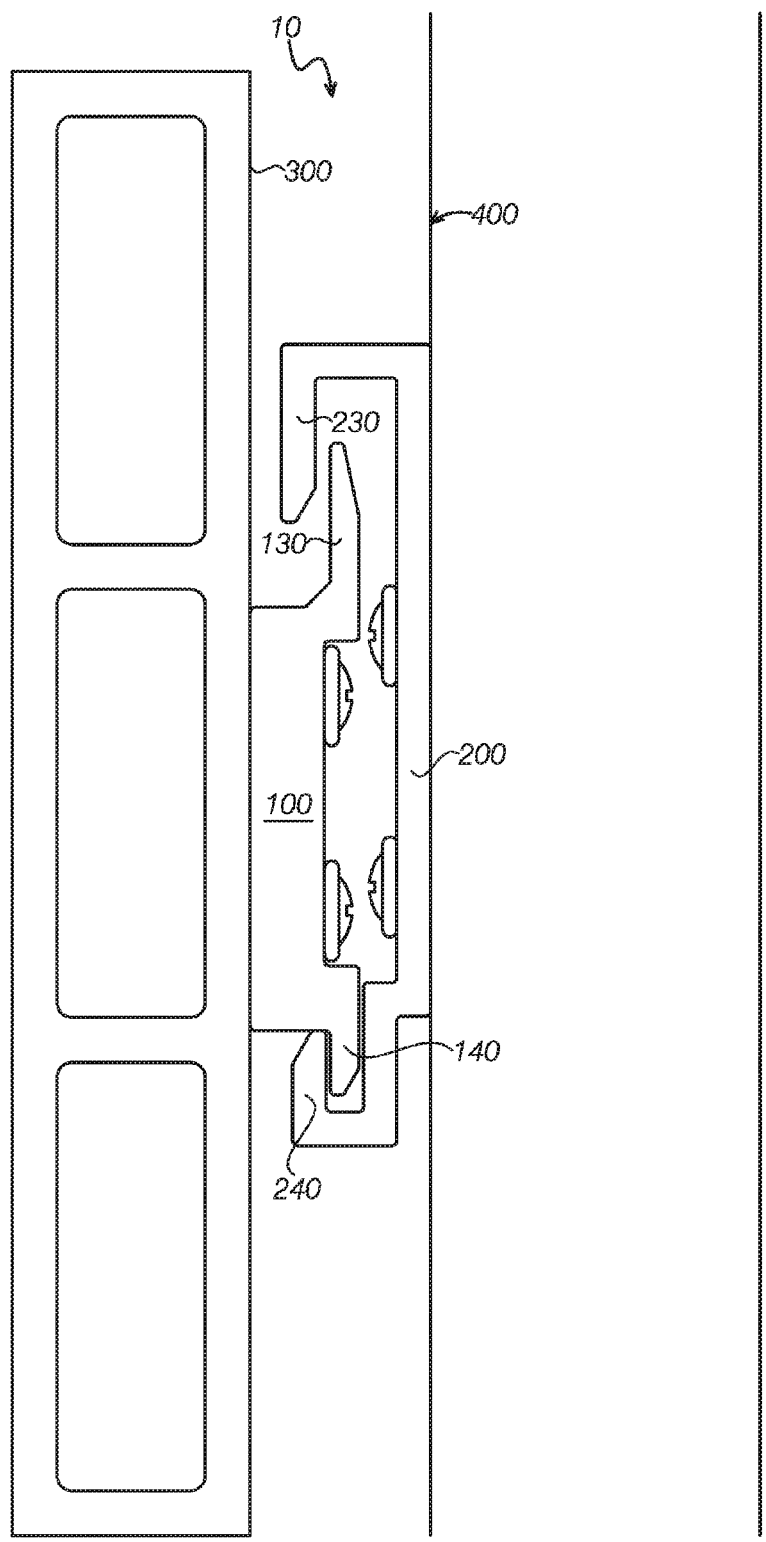
FIG. 4 is a cross sectional view of the mounting system of FIG. 3 showing the male coupling being completely engaged with the female coupling.

Turning now to FIG. 4, a second cross sectional view of mounting system 10 is shown, wherein male coupling 100 has been secured to female coupling 200. Both upper and lower flanges 130, 140 of male coupling 100 are secured by the upper and lower lips 230, 240 respectively, of the female coupling 200. Thus, first surface 300 is securely mounted to second surface 400.

The male and female couplings 100, 200 can be separated only by reversing the process of attaching them together. In this regard, inadvertent jostling or bumping of surface 300 will not release the mounting system 10. Furthermore, because both upper and lower flanges 130, 140 are secured by the female coupling 200, the mounting system may be used in any orientation, such as on a ceiling or floor.

Furthermore, channel 232 may be configured to allow upper flange 130 to slide horizontally therein. Similarly, channel 242 may be configured to allow lower flange 140 to slide horizontally therein. In this regard, male coupling 100 may be configured to slide back and forth within female coupling 200 when the two couplings are secured to one another. Thus, thermal expansion and/or contraction of first surface 300 may be alleviated by mounting system 10.

In some embodiments, the male coupling may comprise an aluminum body. In one example the aluminum body is an extruded aluminum body. In other embodiments, the male coupling may comprise a plastic body. In one example, the plastic body is an injection molded plastic body.

Figure 5:
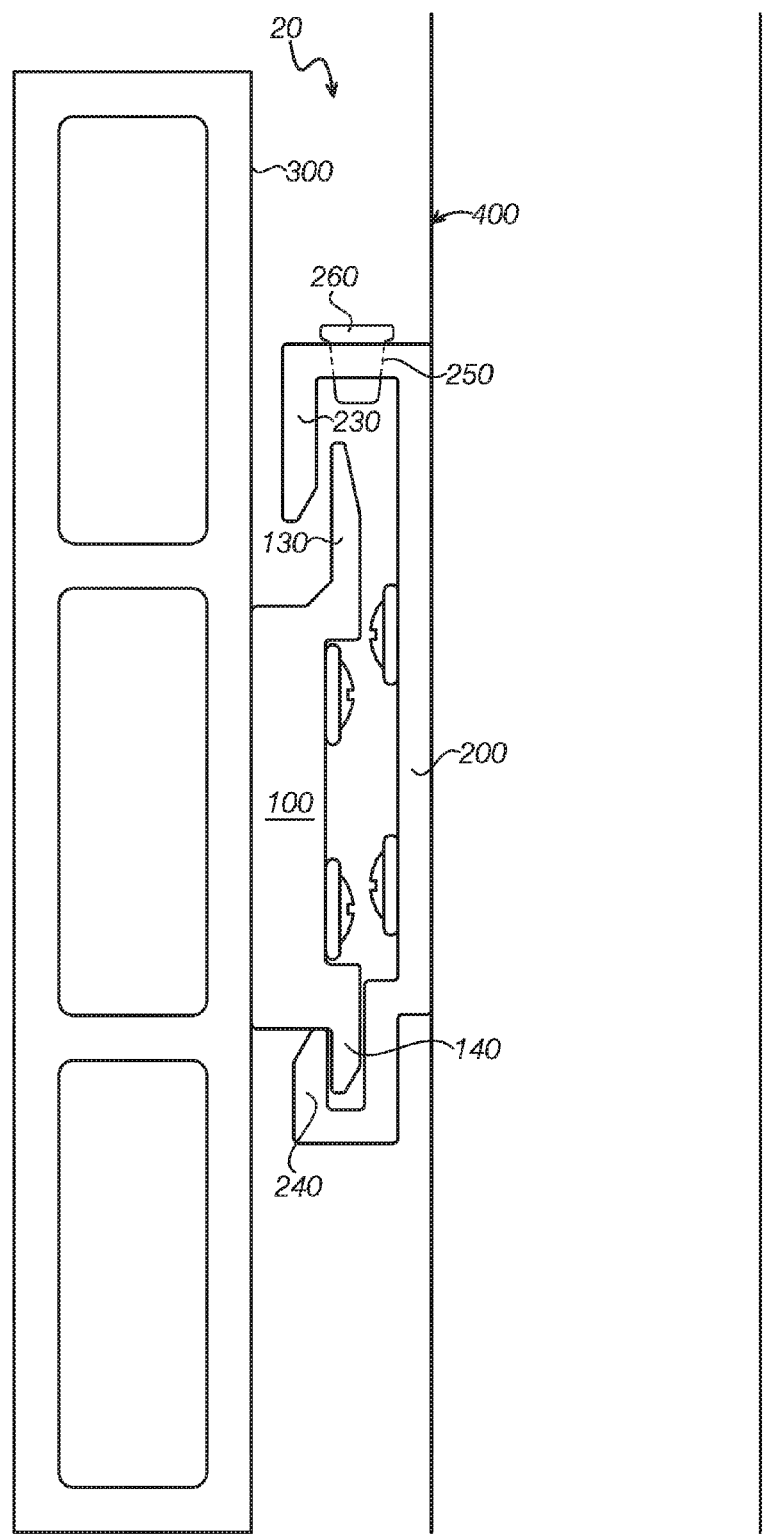
FIG. 5 is a cross sectional view of a second embodiment of a mounting system including a locking pin. of FIG. 1.

Turning now to FIG. 5, a cross sectional view of a second embodiment of a mounting system, mounting system 20, is shown. Mounting system 20 includes many similar or identical features to mounting system 10. Thus, for the sake of brevity, each feature of mounting system 20 will not be redundantly explained. Rather, key distinctions between mounting system 20 and mounting system 10 will be described in detail and the reader should reference the discussion above for features substantially similar between the two mounting systems.

Mounting system 20 includes a hole 250 formed in upper lip 230 and a locking pin 260. Hole 250 may be configured to receive locking pin 260. When in locking pin 260 is engaged in hole 250, locking pin 260 may prevent male coupling 100 from sliding upwards, thereby preventing the couplings from disengaging.

In one embodiment a method of attaching a first surface to a second surface via a mounting system may include the steps of attaching a first rear face of a male coupling to the first surface and attaching a second rear face of a female coupling to the second surface. Next, the upper flange of the male coupling may be placed into the downward-facing open channel of the female coupling. The lower flange of the male coupling may be rotated toward the upward-facing channel of the female coupling. The lower flange may be slid into the upward-facing channel, thereby securing the male coupling to the female coupling.

In one embodiment, the method may include sliding the male coupling laterally relative to the female coupling. In some embodiments, the sliding may be due at least partially to thermal expansion of at least one of the first and second surfaces. Thus, at least one of the first and second surfaces may comprise a thermally expansive material. In one embodiment, the method may include placing a locking pin in a hole formed in the upper lip of the female coupling, thereby locking the male and female couplings together.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A system comprising:
   a male coupling having:
      a first rear face configured to attach to a first surface;
      a first front face;
      an upper flange extending upward from the first front face;
      a lower flange extending downward from the first front face; and
   a female coupling configured to mate with the male coupling, the female coupling having:
      a second rear face configured to attach to a second surface;
      a second front face;
      an upper lip disposed on the second front face, the upper lip forming a downward-facing open channel; and
      a lower lip disposed on the second front face, the lower lip forming an upward-facing open channel;
   wherein the upper lip is configured to receive the upper flange and allow it to pivot in the downward-facing open channel, thereby bringing the lower flange proximal the lower lip;
   wherein the lower lip is configured to receive the lower flange in the upward-facing open channel, thereby securing the male coupling to the female coupling; and
   wherein the male coupling is configured to provide sufficient clearance within the female coupling to allow the male coupling to freely slide laterally within the female coupling.

2. The system of claim 1 comprising:
   a locking pin; and
   a hole formed in the upper lip, wherein the hole is configured to receive the locking pin, thereby preventing the male coupling from sliding upwards and locking the male and female couplings together.

3. The system of claim 1, wherein the first rear face of the male coupling is configured to be attached to the first surface via screws.

4. The system of claim 1, wherein the second rear face of the female coupling is configured to be attached to the second surface via screws.

5. The system of claim 1, wherein the male coupling comprises an extruded aluminum body.

6. The system of claim 1, wherein the female coupling comprises an extruded aluminum body.

7. The system of claim 1, wherein the male coupling comprises an injection molded plastic body.

8. The system of claim 1, wherein the female coupling comprises an injection molded plastic body.

9. A method of attaching a first surface to a second surface, the method comprising:
   attaching a first rear face of a male coupling to the first surface, wherein the male coupling comprises:
      the first rear face;
      a first front face;
      an upper flange extending upward from the first front face;
      a lower flange extending downward from the first front face;
   attaching a second rear face of a female coupling to the second surface, wherein the female coupling comprises:
      the second rear face;
      a second front face;
      an upper lip disposed on the second front face, the upper lip forming a downward-facing open channel; and
      a lower lip disposed on the second front face, the lower lip forming an upward-facing open channel;
   placing the upper flange of the male coupling into the downward-facing open channel of the female coupling;
   rotating the lower flange of the male coupling toward the upward-facing channel of the female coupling;
   sliding the lower flange into the upward-facing channel, thereby securing the male coupling to the female coupling; and
   sliding the male coupling laterally within the female coupling.

10. The method of claim 9, wherein the sliding is due at least partially to thermal expansion of at least one of the first and second surfaces.

11. The method of claim 9 comprising:
   placing a locking pin in a hole formed in the upper lip of the female coupling, thereby preventing the male coupling from sliding upwards and locking the male and female couplings together.

12. The method of claim 9, wherein at least one of the first and second surfaces comprises a thermally expansive material.

13. The method of claim 12 comprising:
   thermally expanding at least one of the first and second surfaces;
   sliding, in response to the thermally expanding step, the male coupling relative to the female coupling.

* * * * *